United States Patent Office 2,895,405
Patented July 21, 1959

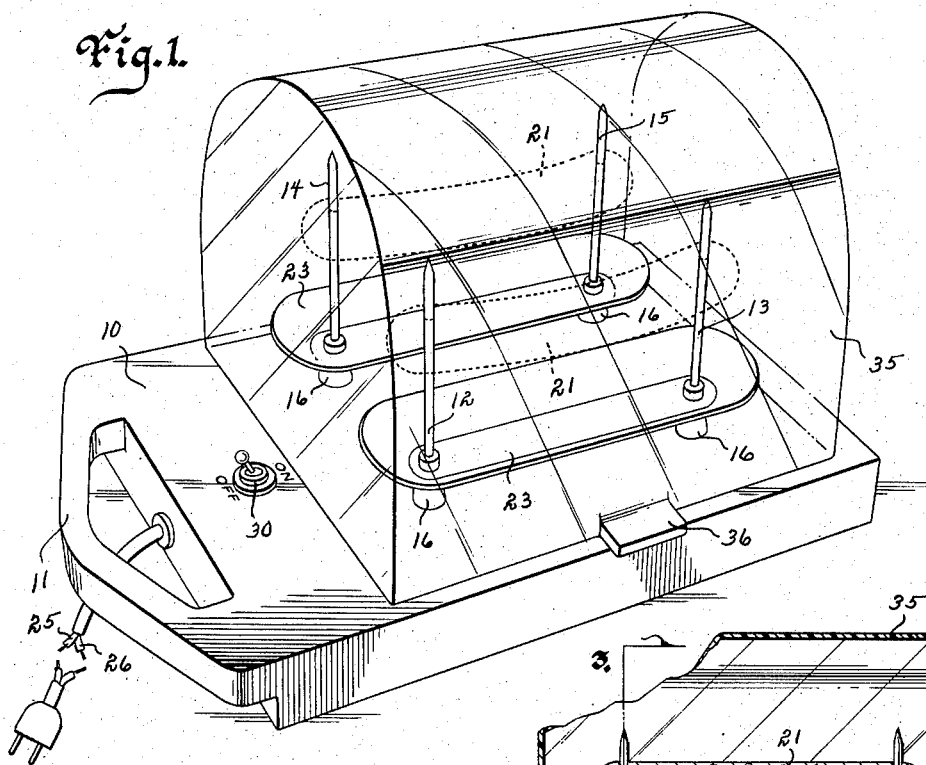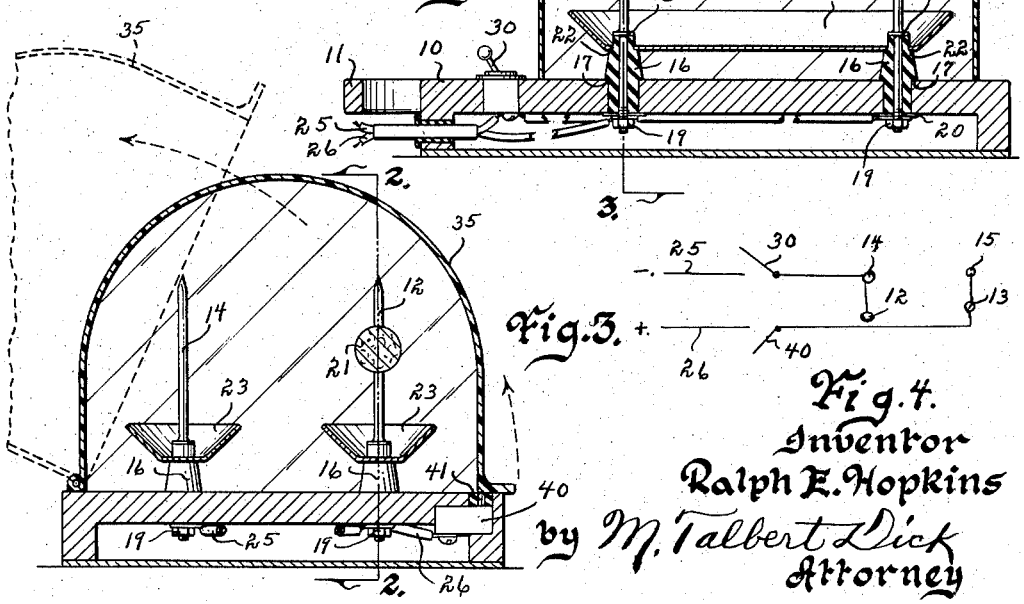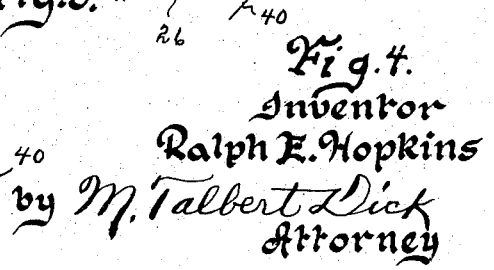

2,895,405

FOOD COOKING DEVICE

Ralph E. Hopkins, Colfax, Iowa

Application October 1, 1956, Serial No. 613,179

2 Claims. (Cl. 99—341)

This invention relates to a food cooking device and more particularly to an electrical wiener or hot dog cooker.

Wieners, hot dogs, sausages and like, are consumed in great volume. The most usual methods of preparing them for eating are to fry them in a skillet, cook them in boiling water, or grill them adjacent an open fire. By any of the above methods, considerable cooking time is required. Also, the edible is often broken or split during the cooking process. In any event much of the desirable juices and taste are lost.

Therefore, one of the principal objects of my invention is to provide a simple and quick means for cooking wieners, sausage, hot dogs, and like.

A further object of this invention is to provide a device for cooking hot dogs or like that makes possible the retaining of much of the juices and flavor of the product being cooked.

A still further object of this invention is to provide an electrical food cooking means that is safe and of few parts.

More specifically, the object of my invention is to provide an electric wiener, sausage, hot dog or like cooker that uses the product to be cooked as a resistance in the electric circuit whereby the product is cooked from the inside out as opposed to the common method of applying heat to the outside of the product.

A still further object of this invention is to provide a hot dog or like cooker that supports the product to be cooked above and in spaced relationship to a drip catch pan.

Still further objects of my invention are to provide a hot dog, wiener, sausage or like cooking means that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my device ready for use,

Fig. 2 is a longitudinal sectional view taken on line 2—2 of Fig. 3 and more fully illustrates its construction, Fig. 3 is a cross sectional view of the device taken on line 3—3 of Fig. 2, and Fig. 4 is a view of the electrical wiring circuit.

In these drawings I have used the numeral 10 to designate the flat base portion having a handle 11 to facilitate its manual handling. Any number of pairs of prongs or spikes may extend upwardly from the base 10. In the drawings I show two pairs designated by the numerals 12 and 13, 14 and 15. These vertical spike prongs are electro-conductive and I recommend that iron, steel or like metal be used. The base may be of any suitable material and, as shown in Fig. 2, I support the spikes by embracing their lower end portions by a non-conductive insulation spool 16. These four spools may be secured to the base 10 by any suitable means. In the drawings I show the spools each provided with a shoulder 17 engaging the top surface of the flat table base 10, and with its reduced lower end portion extending downwardly completely through the base 10. Each insulator 16 has one of the rod prong spikes extending completely through its center. A ring 18 is on each spike to limit its downward sliding movement through its insulator. The numeral 19 designates a nut threaded on the lower end of each of the spikes. Between the nut and the bottom surface of the base 10 and embracing the spike is a washer 20. With the nuts 19 tightened both the spikes and their insulator spools will be secured to the base 10 with the spike extending vertically upward. The upper ends of the spikes are sharpened to pierce the hot dog or like impaled thereon. In Fig. 1, I show a hot dog or like 21 on the two spikes 12 and 13, and a like hot dog 21 on the two spikes 14 and 15. The hot dog is pierced near its two ends by the swo supporting spikes and extends between the two spikes as shown. Each of the insulator spools have a shoulder 22 near its upper end. I provide a detachable tray 23 for each pair of spikes. Each tray has two holes in its bottom for detachably embracing the upper portions of its two supporting insulation spools, as shown in Fig. 2. The shoulders 22 limit the downward movement of the tray. By this arrangement a tray for catching drippings is positioned directly below each hot dog. Although I show only two pairs of spikes, any number of pairs may be employed. Also, more than one hot dog or like may be placed on any one pair of spikes.

The numerals 25 and 26 designate two electric lead wires adapted to be in electrical communication with the plus and minus poles of a source of electrical energy, respectively. In the wiring, the lead 25 is electrically connected to the lower end of the spikes 12 and 14, and the lead wire 26 electrically connected to the lower end of the spikes 13 and 15. If the wiring is connected to a source of electric energy, electricity will flow through one of the lines, thence through a spike, thence through the hot dog or like, thence through the opposite spike, and thence to the other electric lead line. The hot dog or like acts as an electrical resistance to this flow of electricity and immediately will become internally intensely hot, thereby cooking the same. A manual switch 30 may be imposed in the circuit. For safety purposes to prevent manual contact with a spike or spikes while the electric current is turned on, I have provided a transparent non-conductive hood lid 35 hinged to the base 10 and capable of, when in closed position, embracing all of the spikes and hot dogs or like being cooked. The numeral 36 designates a handle on the hood to facilitate its manual movement. As a further safety precaution I have imposed in the electric circuit a contact switch 40 having a depressible actuating pin 41 secured to the base 10 and below the free bottom of the hinged hood. When the pin 41 is depressed by the hood, the electric circuit will be completed. When the hood is raised to expose the spikes, the pin 41 elevates and breaks the electric circuit. In the cooking of the food product, any steam and all material expansion within the hot dog or like will tend to enlarge the hot dog or like and therefore at time of eating the product will be enlarged as distinguished from the shriveling up of the product when cooked by ordinary methods.

The cooking by my device is rapid and easy. The flavor and juices are successfully retained. However, any juices that might drip downwardly would pass into the driptray and be retained.

After a wiener, sausage, hot dog or like becomes sufficiently cooked, the hood cover is raised (breaking the electric circuit) and the food product is then lifted from the supporting spikes.

Some changes may be made in the construction and arrangement of my food cooking device without departing from the real spirit and purpose of my invention, and it is my intention to cover by my claims, any modified forms of structure or use of mechanical equivalents which may be reasonably included within their scope.

I claim:

1. In a food cooker, a base having two spaced apart holes, an insulation spool having a reduced lower end portion extending through each of said holes and having a shoulder engaging the top surface of said base, a pointed vertical spike having electrical conducting characteristics extending through each of said insulation spools, a stop means on each of said spikes engaging the top of the insulation spool through which it extends, a nut threaded on the lower end portion of each of said spikes, an electric lead wire connected to the lower end portion of each of said spikes, and a tray having two openings embracing the upper end portion of said insulation spools.

2. In a food cooker, a base having two spaced apart holes, an insulation spool having a reduced lower end portion extending through each of said holes and having a shoulder engaging the top surface of said base, a pointed vertical spike having electrical conducting characteristics extending through each of said insulation spools, a stop means on each of said spikes engaging the top of the insulation spool through which it extends, a nut threaded on the lower end portion of each of said spikes, an electric lead wire connected to the lower end portion of each of said spikes, a tray having two openings embracing the upper end portion of said insulation spools, and a transparent hood cover hinged to said base and capable of being manually swung to a position for embracing that part of the spikes that extends above said base.

References Cited in the file of this patent

UNITED STATES PATENTS

| | | |
|---|---|---|
| 2,052,919 | Brogdon et al. | Sept. 1, 1936 |
| 2,345,049 | Hunter | Mar. 28, 1944 |
| 2,494,903 | Sheidler | Jan. 17, 1950 |
| 2,621,587 | Savio | Dec. 16, 1952 |
| 2,642,794 | Spiess | June 23, 1953 |
| 2,659,296 | Tyler | Nov. 17, 1953 |
| 2,776,358 | Sturr | Jan. 1 1957 |